Jan. 19, 1937. G. E. MICHELSEN 2,068,559
SINGLE PHASE MULTISPEED MOTOR CONTROL
Filed May 29, 1936
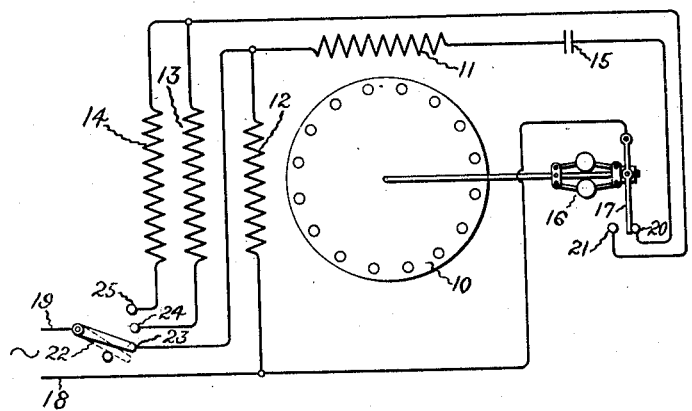
Inventor:
G. Eberhard Michelsen
by Harry C. Dunham
His Attorney.

Patented Jan. 19, 1937

2,068,559

UNITED STATES PATENT OFFICE 2,068,559

SINGLE-PHASE MULTISPEED MOTOR CONTROL

G. Eberhard Michelsen, Fort Wayne, Ind., assignor to General Electric Company, a corporation of New York Application May 29, 1936, Serial No. 82,491

5 Claims. (Cl. 172—279)

My invention relates to the control of multispeed single-phase motors and its object is to provide a control for such motors which utilizes few leads and a single switch for energizing and deenergizing the motor under normal conditions, for changing its speed and which serves, in conjunction with the usual automatic starting switch, to protect the motor against certain overload and stalling conditions.

The features of my invention which are believed to be novel and patentable will be pointed out in the claims appended hereto. For a better understanding of my invention, reference is made in the following description to the accompanying drawing illustrating my invention as used for the control of a three-speed single-phase motor.

Referring now to the drawing, I have represented a single-phase motor of the induction type having a squirrel cage rotor 10, a starting winding 11, and main windings 12, 13, and 14 of different pole numbers or having characteristics to produce different speeds for operating the motor at three different speeds. A greater or lesser number of different speed main windings might be used without departing from the invention.

Preferably, the low-speed main winding 12 is used in conjunction with the starting winding 11 to start the motor, hence windings 11 and 12 have their axes displaced and the circuits of these two windings will have a phase displacement in accordance with usual practice to obtain split-phase starting. I have represented a condenser 15 in the starting winding circuit, to obtain the phase displacement, however, the proper phase displacement may be obtained in any of the usual ways. While the intermediate and high-speed running windings 13 and 14 are represented as having their axes displaced from that of the starting winding 11, this is unnecessary as, with the control represented, these windings may be wound on any axis that is convenient and economical in constructing the motor.

16 represents an automatic device for cutting out the starting winding circuit after the motor has come up to speed. A centrifugal device is illustrated but any other form of device responsive to the speed condition of the motor may be employed for this purpose. The device 16 is shown in the starting position with the movable contact 17 thereof connecting supply terminal 18 to one end of the starting winding circuit through stationary contact 20. The starting winding circuit is completed to the other supply terminal 19 when the energizing and speed-selecting switch 22 rests on contact 23. After the motor has started and reached some speed less than the minimum running speed, the speed-responsive device 16 operates and throws contact member 17 from stationary contact 20 to another stationary contact 21, thereby opening the starting winding circuit and simultaneously connecting supply line 18 to one end of the main windings 13 and 14. The low-speed main winding 12 has one end permanently connected to supply terminal 18 and the other end is connected to contact 23. Thus, for starting, with switch 22 in the starting and low-speed operating position, the starting winding circuit will be connected in parallel with the low-speed winding 12 across the supply terminals 18 and 19 until the starting switch 17 operates, after which the motor will operate at its lowest operating speed on winding 12 alone.

It is seen that, as soon as the motor comes up to speed, one end of each main winding is connected to supply terminal 18, winding 12 being permanently so connected and windings 13 and 14 being so connected only through contacts 17 and 21 of the speed-responsive switch. The other ends of these windings are connected to stationary contacts 23, 24, and 25 of the energizing and speed-selecting switch 22 so that now their energizing circuits may be completed and the speed of the motor may be raised and lowered at will by movement of switch member 22 and the motor may be stopped by moving this same switch to the open position indicated in dotted lines. If during intermediate or high-speed operation on windings 13 and 14, the motor should become overloaded and slow down or become stalled, the speed-responsive switch 17 moves back to contact 20 and deenergizes the motor, thereby preventing windings 13 and 14 from remaining energized under such conditions and, to this extent, protecting the motor windings from burning out. The motor cannot be started again until switch 22 is moved to the starting position on contact 23.

It is seen that the simple switch 22 serves as a line switch, a speed-adjusting switch, and, in conjunction with the extra contact 21 on the usual speed-responsive switch, as a protective device for the motor. Only four leads are required to be brought out of the three speed motor illustrated. For a two speed motor only three motor leads would be required. The winding 12 used in starting has been designated as the low-speed main winding. It is equally possible to make this the high or intermediate-speed winding so long as the two windings which are used in starting are of the same pole number or otherwise cooperate to produce starting torque. In general, however, it is preferable to use the low-speed main winding for starting.

In accordance with the provisions of the patent statute, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A single-phase variable-speed motor having a starting winding and a plurality of main windings of unlike pole number, a pair of supply terminals, circuits connecting means for connecting one main winding and the starting winding in parallel circuits and to one supply terminal for starting the motor, said circuit-connecting means including a speed-responsive switch for disconnecting the starting winding circuit from one end of said main winding as the motor comes up to speed, said switch having a running position connecting said one supply terminal to one end of the other main winding, and a motor-control switch for selectively connecting the other supply terminal to the other ends of the different main windings.

2. A single-phase motor having main and starting windings of like pole number and a running winding of a different pole number, supply terminals, circuit-connecting means for connecting the main and starting windings in parallel circuits including a switch responsive to the speed of the motor having a movable contact connected to one supply terminal and to one end of the main winding and having a starting position through which said parallel circuit connection is established and a running position where the starting winding circuit is opened and the movable switch contact connects said one supply terminal to one end of said running winding, and a switch for energizing and controlling the speed of said motor for alternately connecting the other supply terminal to the other ends of said main and running windings.

3. A single-phase variable-speed motor having main and starting windings of like pole number and a running winding of a different pole number, a speed-responsive switch with a movable contact having different starting and running positions, a pair of supply terminals, one terminal being permanently connected to one end of said main winding and to said movable contact, circuit-connecting means including said switch for connecting the main and starting windings in parallel circuits when said switch is in the starting position and opening the starting winding circuit when said switch is in the running position, a connection made by said switch in its running position only to one end of said running winding through which and only through which said running winding may be energized, and a speed-selecting and energizing switch for alternately connecting the other supply terminal to the other ends of said main and running windings.

4. A single-phase variable-speed motor having a starting winding and a plurality of different speed main windings, a pair of supply terminals, a speed-selecting and energizing switch for connecting one of said terminals to one end of any one of said main windings, a speed-responsive switch with a movable contact having different starting and running positions, and circuit-connecting means including the speed-responsive switch for connecting said starting winding in a parallel circuit with one of said main windings when said movable contact is in its starting position, said movable contact opening said starting winding circuit when in its running position, said last mentioned main winding having its opposite end permanently connected to the other supply terminal and the remaining main windings having their opposite ends connected to said other supply terminal through said movable contact when it is in its running position only.

5. A single-phase variable-speed motor having a starting winding and a plurality of different speed main windings, a pair of supply terminals, a switch for selectively connecting one of said terminals to one end of any one of said main windings, one of said main windings having its other end permanently connected to the other supply terminal, circuit-connecting means for connecting the starting winding in parallel circuit with the last mentioned main winding for starting the motor, said circuit-connecting means including a speed-responsive switch for opening the starting winding circuit as the motor comes up to speed, and a contact associated with said speed-responsive switch for completing the supply circuit to the other main windings only when said motor is operating at a speed above that at which the starting winding circuit is opened.

G. EBERHARD MICHELSEN.